US010025674B2

(12) United States Patent
Goel et al.

(10) Patent No.: US 10,025,674 B2
(45) Date of Patent: Jul. 17, 2018

(54) FRAMEWORK FOR RUNNING UNTRUSTED CODE

(71) Applicant: Microsoft Corporation, Redmond, WA (US)

(72) Inventors: Nitin Kumar Goel, Bothell, WA (US); Cristian Craioveanu, Seattle, WA (US); Jinwook Shin, Newcastle, WA (US); Elia Florio, Seattle, WA (US); Craig Douglas Wilkey, Jr., Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1078 days.

(21) Appl. No.: 13/913,329

(22) Filed: Jun. 7, 2013

(65) Prior Publication Data

US 2014/0365443 A1     Dec. 11, 2014

(51) Int. Cl.
| | |
|---|---|
| *G06F 17/00* | (2006.01) |
| *G06F 11/14* | (2006.01) |
| *G06F 11/36* | (2006.01) |
| *G06F 9/4401* | (2018.01) |
| *G06F 21/53* | (2013.01) |

(52) U.S. Cl.
CPC .......... *G06F 11/1469* (2013.01); *G06F 9/441* (2013.01); *G06F 11/3664* (2013.01); *G06F 21/53* (2013.01); *G06F 2221/2141* (2013.01); *G06F 2221/2149* (2013.01)

(58) Field of Classification Search
CPC ...... G06F 11/1469; G06F 21/53; G06F 9/441; G06F 11/3664; G06F 11/3668
USPC .................................................. 707/674, 679
See application file for complete search history.

(56) References Cited

U.S. PATENT DOCUMENTS

| | | | |
|---|---|---|---|
| 7,653,794 B2* | 1/2010 | Michael | G06F 9/4401 711/162 |
| 8,219,983 B1* | 7/2012 | Sobel | G06F 8/60 717/126 |
| 8,245,227 B2 | 8/2012 | Devine et al. | |
| 8,505,102 B1* | 8/2013 | Cannings | H04L 63/145 713/187 |
| 9,317,400 B2* | 4/2016 | Cai | G06F 11/3676 |
| 2002/0053044 A1* | 5/2002 | Gold | G06F 11/1417 714/6.24 |
| 2006/0015717 A1 | 1/2006 | Liu et al. | |
| 2007/0033386 A1* | 2/2007 | Lin | G06F 21/6218 713/1 |

(Continued)

OTHER PUBLICATIONS

"Written Opinion of the International Preliminary Examining Authority," From PCT Patent Application No. PCT/US2014/040779, dated Mar. 19, 2015, 9 pages.

(Continued)

*Primary Examiner* — Phong H Nguyen
(74) *Attorney, Agent, or Firm* — Cooper Legal Group, LLC

(57) ABSTRACT

A processing platform is described herein for performing a task on a physical system. For example, the task may entail testing untrusted code on the physical system. The processing platform provides the same isolation guarantees as a virtual machine, but without using a virtual machine. A processing framework is also described herein which includes two or more processing platforms, together with a control system for administering the operations performed by the processing platforms.

20 Claims, 8 Drawing Sheets

(56) References Cited

U.S. PATENT DOCUMENTS

| | | | |
|---|---|---|---|
| 2008/0162914 A1* | 7/2008 | Adrangi | G06F 9/441 713/2 |
| 2009/0119778 A1* | 5/2009 | Bhuyan | G06F 9/441 726/25 |
| 2010/0042994 A1 | 2/2010 | Vasilevsky et al. | |
| 2010/0115010 A1* | 5/2010 | Anderson | G06F 17/30115 707/825 |
| 2010/0299368 A1* | 11/2010 | Hutchins | G06F 9/455 707/803 |
| 2010/0313185 A1 | 12/2010 | Gupta et al. | |
| 2010/0333189 A1* | 12/2010 | Droux | H04L 63/0227 726/13 |
| 2011/0072255 A1* | 3/2011 | Gopalakrishnan | G06F 9/4416 713/2 |
| 2011/0138390 A1* | 6/2011 | Takeuchi | G07F 7/1008 718/100 |
| 2011/0202916 A1 | 8/2011 | VoBa et al. | |
| 2011/0231280 A1* | 9/2011 | Farah | G06Q 10/10 705/26.8 |
| 2012/0151199 A1 | 6/2012 | Shriver | |
| 2012/0151200 A1* | 6/2012 | Beachem | H04L 9/0894 713/2 |
| 2012/0233448 A1 | 9/2012 | Malkhasyan et al. | |
| 2013/0031374 A1 | 1/2013 | Thom et al. | |
| 2013/0212564 A1* | 8/2013 | Cai | G06F 11/3676 717/124 |
| 2013/0219368 A1* | 8/2013 | Carteri | G06F 11/3688 717/126 |

OTHER PUBLICATIONS

Search Report and Written Opinion for PCT/US2014/040779, dated Aug. 9, 2014, 16 pages.
"Innotek VirtualBox User Manual, Version 1.5.6," available at «http://downloads.bosslinux.in/VIRTUALIZATION/UserManual.pdf», innotek GmbH, Weinstadt Germany, Feb. 19, 2008, 182 pages.
"Volume Shadow Copy Service Technical Reference," available at «http://technet.microsoft.com/en-us/library/cc738819(v=ws.10).aspx», Microsoft TechNet, Microsoft Corporation, Redmond WA, Mar. 28, 2003, 18 pages.
Alexander, Zubair, "Windows Advisor: Safer Laptops with BitLocker," available at «http://mcpmag.com/articles/2007/03/14/safer-laptops-with-bitlocker.aspx?admgarea=BDNA», Microsoft Certified Professional Magazine, Mar. 14, 2007, 3 pages.
Raj, et al., "Credo: Trusted Computing for Guest VMs with a Commodity Hypervisor," retrieved at «http://131.107.65.14/pubs/157213/hs.pdf», Microsoft Technical Report No. MSR-TR-2011-130, Dec. 16, 2011, 12 pages.
Kane, et al., "Cyclotron: A Secure, Isolated, Virtual Cycle-Scavenging Grid in the Enterprise," retrieved at «http://research.microsoft.com/pubs/81607/a2-kane.pdf», Proceedings of the 6th International Workshop on Middleware for Grid Computing, Dec. 2008, 6 pages.
Biyikli, Mert, "VDI Security—Using Encryption to Protect Virtual Machine Resources," retrieved at «http://blogs.technet.com/b/microsoftsetup/archive/2009/04/12/vdi-security-using-encryption-to-protect-virtual-machine-resources.aspx», Mert's Desktop: This blog is about enterprise computing, Apr. 12, 2009, 2 pages.
"Boot From VHD—Advanced Usages," retrieved at «http://www.tsaysoft.com/knowhow/BootFromVHD/», retrieved on Jun. 6, 2013, Tsaysoft, 2 pages.
Stewart, Heath, "Booting Windows to a Differencing Virtual Hard Disk," retrieved at «http://blogs.msdn.com/b/heaths/archive/2009/10/13/booting-windows-to-a-differencing-virtual-hard-disk.aspx», Setup & Install by Heath Stewart, Oct. 13, 2009, 4 pages.
Varanasi, et al., "Hardware-Supported Virtualization on ARM," retrieved at «http://acm.org», Proceedings of the Second Asia-Pacific Workshop on Systems, Article No. 11, Jul. 2011, 5 pages.
"Understanding Virtual Hard Disks with Native Boot," retrieved at «http://technet.microsoft.com/en-us/library/hh825689.aspx», retrieved on Jun. 6, 2013, updated on May 31, 2012, Microsoft Corporation, Redmond, WA, 7 pages.
Rudy, Scott, "Using Boot From VhD With BitLocker," retrieved at «http://h30507.www3.hp.com/t5/The-Watering-Can-of-Enterprise/Using-Boot-From-VHD-With-BitLocker/ba-p/108445», Hewlett-Packard Development Company, Palo Alto, CA, Mar. 7, 2012, 2 pages.
"BitLocker Drive Encryption," retrieved at «http://en.wikipedia.org/wiki/Bitlocker_drive_encryption», retrieved on Jun. 6, 2013, Wikipedia article, 5 pages.
"Using differencing disks," retrieved at «http://technet.microsoft.com/en-us/library/cc720381(v=ws.10).aspx», retrieved on Jun. 6, 2013, Microsoft TechNet, Microsoft Corporation, Redmond, WA, 5 pages.
"VHD (file format)," retrieved at «http://en.wikipedia.org/wikiNHD_(file_format)», retrieved on Jun. 6, 2013, Wikipedia article, 5 pages.
"Microsoft Visual SourceSafe," retrieved at «http://en.wikipedia.org/wiki/Microsoft_Visual_SourceSafe», retrieved on Jun. 6, 2013, Wikipedia article, 3 pages.
"BitLocker Drive Encryption Overview," retrieved at «http://windows.microsoft.com/en-us/windows-vista/bitlocker-drive-encryption-overview», retrieved on Jun. 6, 2013, Microsoft Corporation, Redmond, WA, 2 pages.
"Trusted Platform Module," retrieved at «http://en.wikipedia.org/wiki/Trusted_Platform_Module», retrieved on Jun. 6, 2013, Wikipedia article, 5 pages.
International Preliminary Report on Patentability dated Jun. 22, 2015 from PCT Patent Application No. PCT/US2014/040779, 22 pages.
PCT Demand under Article 31/Response filed Dec. 22, 2014 to International Search Report and Written Opinion dated Sep. 8, 2014 from PCT Patent Application No. PCT/US2014/040779, 20 pages.
Response filed Feb. 18, 2016 to the Official Communication dated Jan. 14, 2016 from European Patent Application No. 147396124.0, 21 pages.
"Booting Once-Only—GNU GRUB Manual 0.97", Retrieved from «https://web.archive.org/web/20130512040439/http://www.gnu.org/software/grub/manual/legacy/Booting-once_002donly.html», May 12, 2013, 1 Page.
"Office Action Issued in European Patent Application No. 14736124.0", dated Sep. 8, 2016, 6 Pages.
"First Office Action Issued in Chinese Patent Application No. 201480032542.5", dated Mar. 20, 2018, 15 Pages.

* cited by examiner

FRAMEWORK FOR RUNNING UNTRUSTED CODE

BACKGROUND

In one technique, a testing framework can test untrusted code by running it on a virtual machine. The abstraction provided by the virtual machine prevents the untrusted code from harming the underlying system which hosts the virtual machine. In some cases, however, it may be desirable to run the untrusted code on the physical system itself, without the abstraction of a virtual machine. For example, in some cases, the underlying physical system may not support (or may not readily support) the use of a virtual machine or emulator. For instance, physical systems which use ARM-based technology, such as smartphones, etc., do not readily accommodate the use of virtual machines at the current time. Alternatively, or in addition, some hardware features (such as Data Execution Prevention technology) within a physical system cannot be fully abstracted by a virtual machine or emulator.

SUMMARY

A processing platform is described herein for performing a task directly on the resources of a physical system. In doing so, the processing platform provides the same type of isolation guarantees as a virtual machine, but without using a virtual machine.

In one approach, the processing platform can achieve the above result by using two file systems, each of which may be loaded to run an operating system (OS). The first file system uses a file protection mechanism to provide a first, safe, version of the OS. The second file system provides a second, unsafe, version of the OS. In operation, an agent, having access to the first OS, first performs a check to ensure that the second OS has not been corrupted. The processing platform then stores the state of the second OS, boots into the second OS, and performs the task using the resources of the second OS. The processing platform then boots back into the first OS to retrieve the results of the task, followed by restoring the second file system to its prior clean state.

By virtue of the use of the file protection mechanism, the processing platform can ensure that the task that is run on the second unsafe OS cannot compromise the operations performed by the first safe OS. By virtue of the restoration of the second file system, the processing platform can ensure that any harmful effects produced by the task will not impact second file system; furthermore, this result can be achieved without performing the costly operation of reinstalling any OS from scratch.

The second file system can store and later restore the clean state of the second OS in various ways. In one approach, the second file system provides a parent OS implemented using a virtual hard disk (VHD), and then produces a differencing disk to store changes made to the second file system. The second file system restores the clean state by discarding the differencing disk after the task has been performed. In another approach, the second file system uses a state-storing mechanism to store a snapshot of the second OS in its clean state. The second file system runs the test using the resources of the second OS, and then uses the stored snapshot to return the second OS to its clean state based on the snapshot.

A processing framework is also described herein which includes two or more processing platforms, together with a control system for administering the operations performed by the processing platforms.

The above approach can be manifested in various types of systems, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4 also shows flow paths which describe one manner of operation of this implementation of the second file system.

FIG. 5 also shows flow paths which describe one manner of operation of this implementation of the second file system.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes illustrative functionality for performing a task on a physical system that provides the same isolation guarantees as a virtual machine, but without use of a virtual machine. Section B sets forth an illustrative method which explains the operation of the functionality of Section A. Section C describes illustrative computing functionality that can be used to implement any aspect of the features described in Sections A and B.

Figure 8:
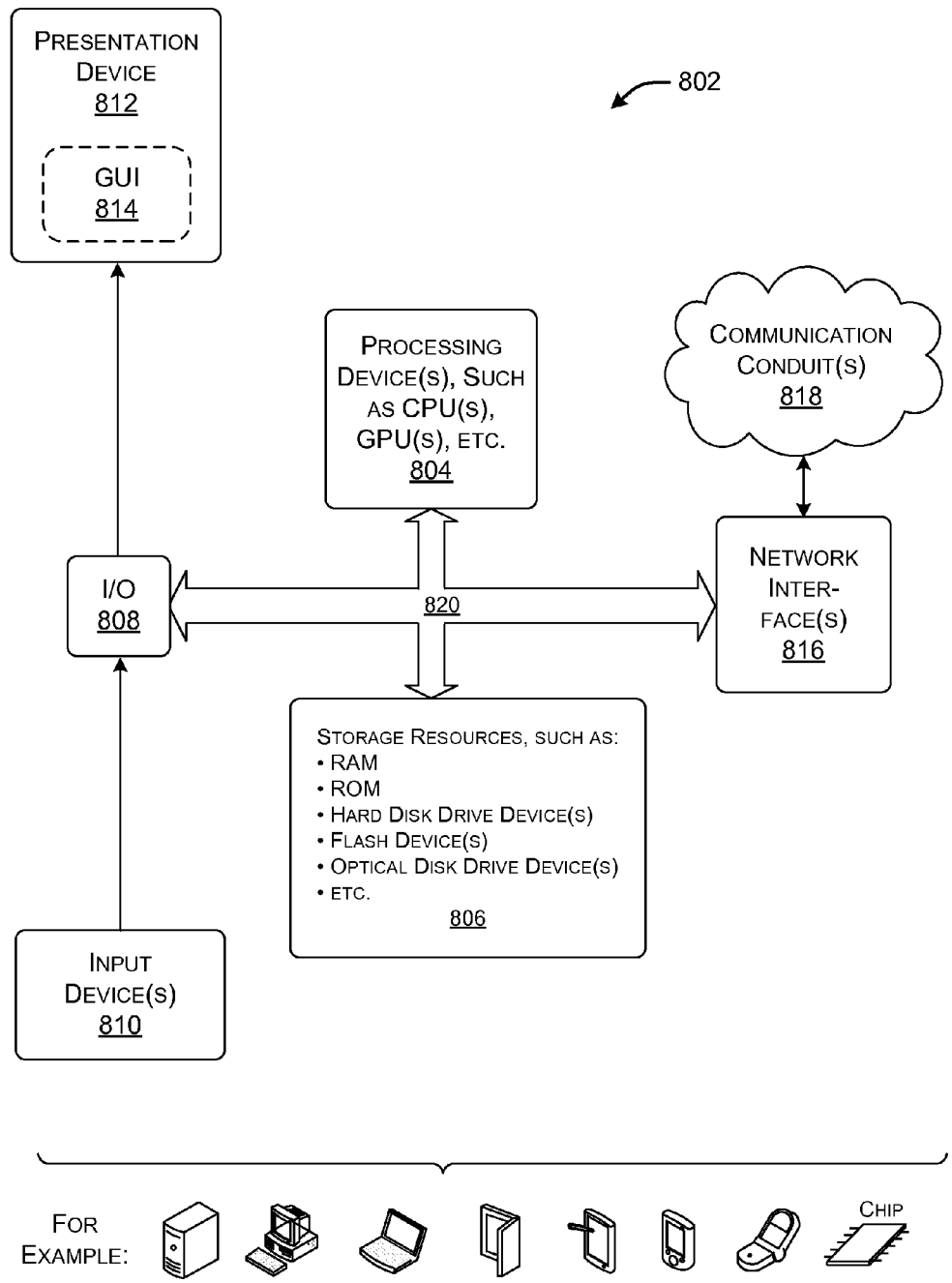
FIG. 8 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in various ways by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 8, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations.

A. Illustrative Processing Framework

Figure 1:
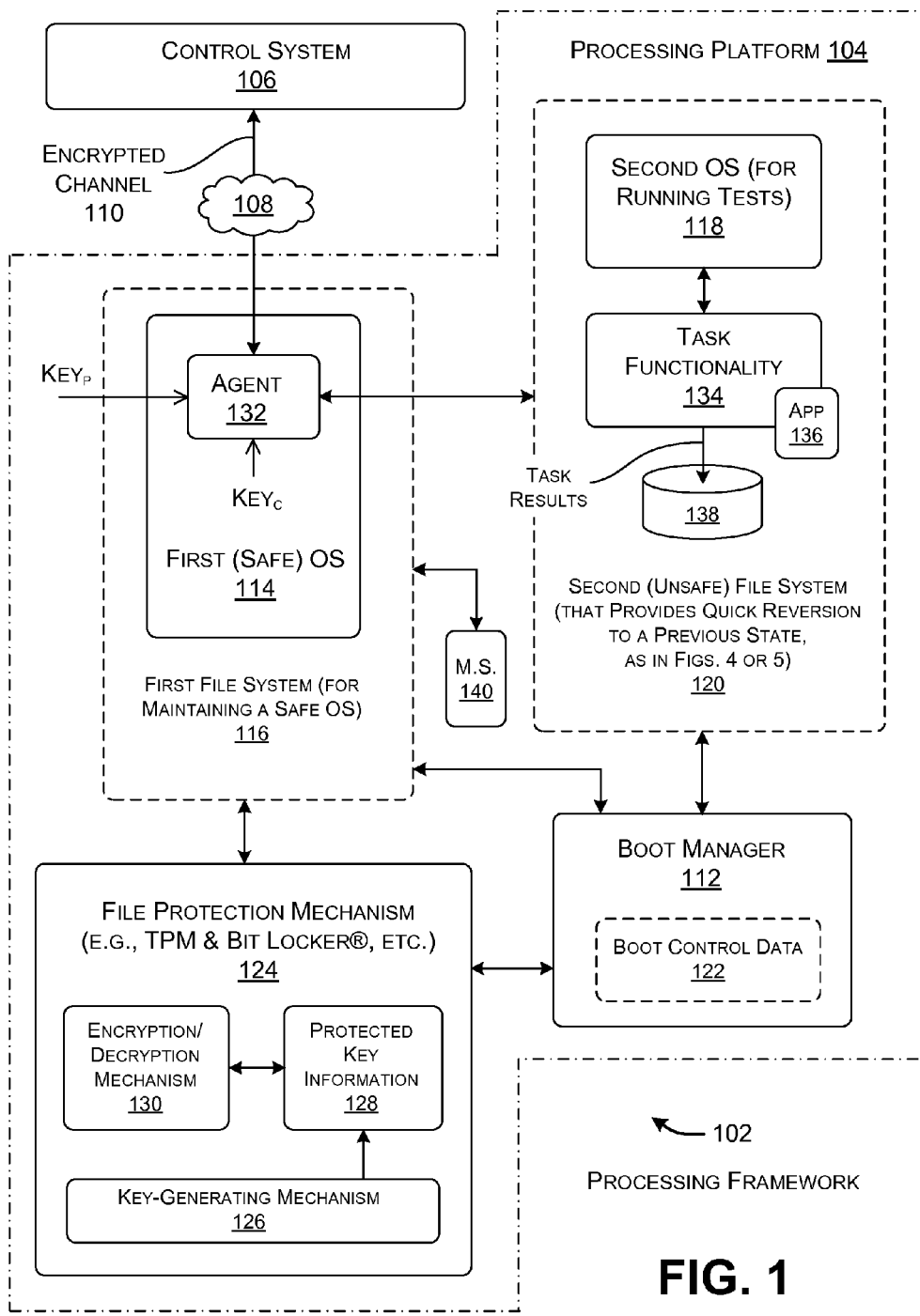
FIG. 1 shows an illustrative processing framework for performing tasks on one or more processing platforms. Each processing platform uses a first file system for providing a safe version of an operating system (OS) and a second file system for providing an unsafe version of the OS.

FIG. 1 shows an illustrative processing framework 102 for performing tasks on one or more processing platforms, such as a representative processing platform 104. The tasks may involve the execution of one or more computer programs for any reason. For example, a task may involve performing one or more tests on untrusted code, such as an application (app) submitted to a marketplace; this scenario is described in additional detail (below) with reference to FIG. 6.

The processing framework 102 may include a control system 106 which administers the operations performed on one or more processing platforms. For example, the control system 106 may schedule the tasks to be performed by the individual processing platforms. The control system 106 may also collect the results of the tasks performed by the individual processing platforms.

The control system 106 may be implemented as one or more computer devices, provided at a local or remote location with respect to the suite of processing platforms. For example, the control system 106 may correspond to remote functionality that is implemented by one or more servers, with which the processing platforms communicate via any network 108, such as a local area network, a wide area network (e.g., the Internet), one or more point-to-point links, and so on. More specifically, the control system 106 may interact with each processing platform via an encrypted channel, such as a representative encrypted channel 110. The encrypted channel 110 can be implemented in various ways, such as by using a Transport Layer Security (TLS) mechanism or the like.

The representative processing platform 104 may include a boot manager 112 for loading an operating system (OS) from different file systems. More specifically, the boot manager 112 can load a first OS 114 that is provided by a first file system 116, or a second OS 118 that is provided by a second file system 120. The boot manager 112 makes this choice based on boot control data provided in a boot data store 122. For example, as a default, the boot manager 112 may attempt to load the first OS 114 provided by the first file system 116. But upon discovering a one-time redirect entry in the boot data store 122, the boot manager 112 can alternatively load the second OS 118 provided by the second file system 120.

A file protection mechanism 124 protects the files associated with the first OS 114. For this reason, the first OS 114 is considered a "safe" or secure OS. The file protection mechanism 124 can be implemented in different ways. Without limitation, in one case, the file protection mechanism 124 can be implemented as the BitLocker® mechanism provided by Microsoft® Corporation of Redmond, Wash., operating in conjunction with a Trusted Platform Module (TPM).

More generally, the file protection mechanism 124 can include a mechanism 126 for generating cryptographic key information, and a secure data store 128 for storing the cryptographic key information. The file protection mechanism 124 also includes an encryption/decryption mechanism 130 for encrypting and decrypting information stored by the first file system 116, using the key information stored in the data store 128. The mechanism 130 also provides a protocol for providing access to the first OS 114 upon loading the first OS 114. For example, when the boot manager 112 attempts to load the first OS 114, the mechanism 130 can examine the integrity of the process used to start up the first OS 114, e.g., by comparing a hash of configuration information associated with the first OS 114 with a reference hash (associated with a previous snapshot of the configuration information in its clean state). If that test passes (indicating that the start up process has not been tampered with), then the file protection mechanism 124 can release key information which allows authorized entities to interact with the first OS 114. The file protection mechanism 124 will not, however, release the key information when the boot manager 112 boots into the second OS 118.

An agent 132 manages the execution of the task assigned to the processing platform 104 by the control system 106. FIG. 1 shows that the agent 132 is implemented as a component of the first OS 114 or is otherwise associated with the first OS 114. This represents one implementation. In another case, the agent 132 may represent a separate component of the first file system 116 that can interact with the first OS 114, or a component of some other entity (or entities) within the processing platform 104 that can interact with the first OS 114.

Figure 3:
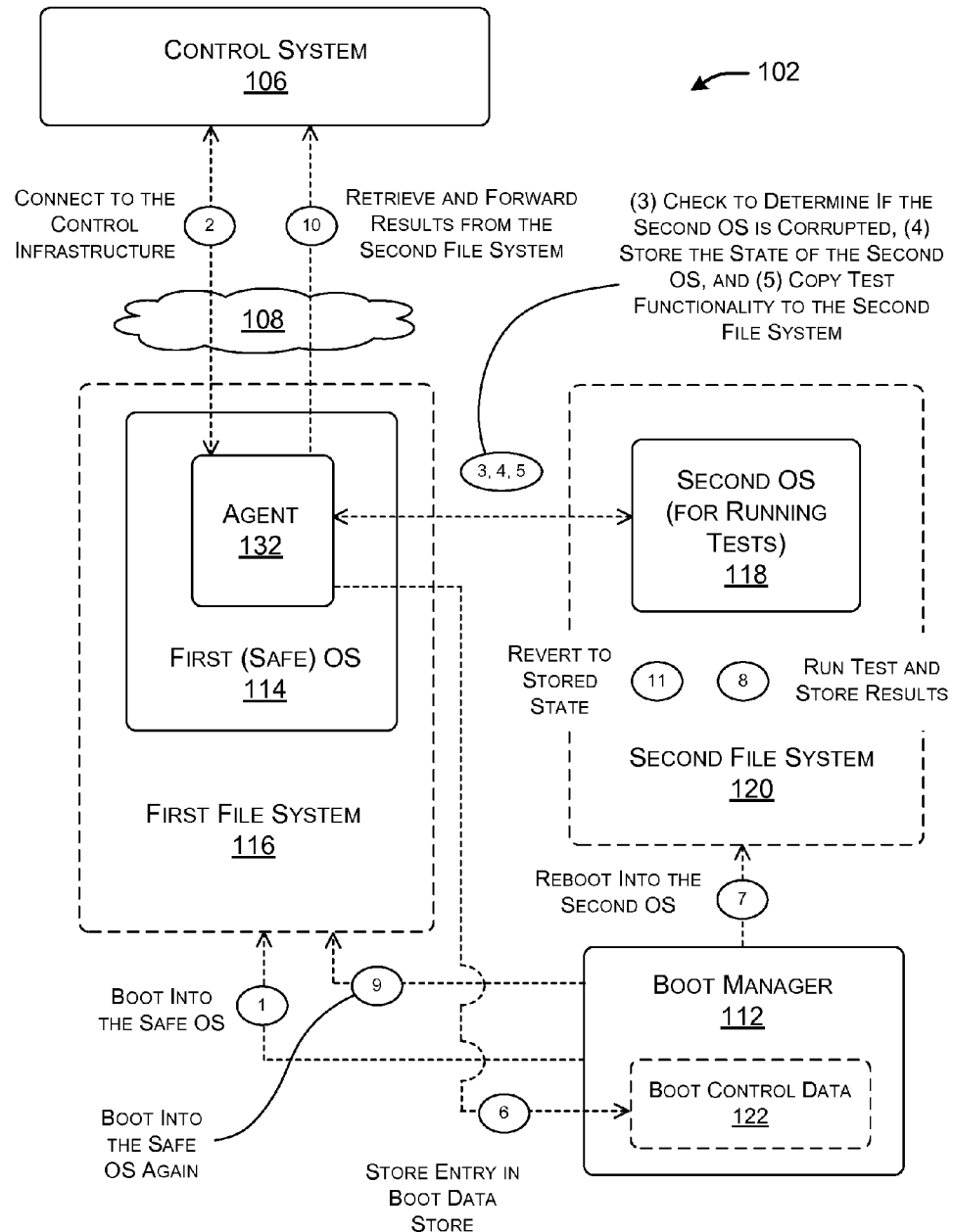
FIG. 3 is a flow diagram which shows an illustrative sequence of operations performed by the processing framework of FIG. 1.

FIG. 3 and the accompanying description provide a detailed explanation of the operations performed by the agent 132. By way of introduction here, the agent 132 first establishes a connection with the control system 106 over the encrypted channel 110. The agent 132 performs this operation using a client authentication key ($Key_C$) stored in the first OS 114, together with a public key ($Key_P$). The agent 132 may receive work instructions from the control system 106 via the channel 110.

The agent 132 then performs a test to determine whether the second OS 118 has been corrupted. It can perform this task by comparing a current hash of the second OS 118 with a reference hash, where that reference hash represents a clean state of the second OS 118. The agent 132 can form the hash in any manner, such as by forming a cryptographic hash (such as the SHA-1 hash).

Next, the agent 132 may store task functionality 134 on the second file system 120. FIG. 1 depicts this implementation. Alternatively, or in addition, the agent 132 can store the task functionality 132 on one or more other entities of the processing platform 104 that are accessible to the first OS 114 and the second OS 118 (such as a separate USB drive, etc.). The task functionality 134 that is provided may represent an application 136 to be tested using the resources of the second OS 118. The task functionality 134 may also represent the test code that performs one or more tests on the application 136. Alternatively, the second file system 120 (and/or some other entity or entities associated with the processing platform 104) may already store the test code. In this case, the agent 132 may forward metadata which simply identifies the test(s) to be run. In addition, the agent 132 can forward one or more parameters which determine the manner in which each test is to be run, e.g., by identifying the settings to be invoked prior to running the test. All such information that is forwarded to the second file system 120 (and/or to some other entity or entities of the processing platform 104) is referred to herein as task functionality 134.

The boot manager 112 then boots into the second OS 118. At this time, the task functionality 134 can perform its operation using the resources of the second OS 118. The task functionality 134 can then store the results of its processing in a data store 138. The data store 138 can be provided by the second file system 120 and/or by some other entity or entities associated with the processing platform 104 (such as a separate USB drive, etc.). The data store 138 is accessible to the first OS 114 and the second OS 118.

Note that the second OS 118 is identified as "unsafe," in contrast to the first OS 114, which is considered safe. The second OS 118 is considered unsafe because it is not protected by the file protection mechanism 124. In addition, the second OS 118 is considered unsafe because it is used to run untrusted code, such as a potentially malicious application 136. The untrusted code can potentially produce undesirable changes in the second file system 120.

Nevertheless, the processing platform 104 provides various measures to prevent the untrusted code from negatively impacting the first OS 114 and the control system 106. As a first measure, again note that the first OS 114 is protected by the file protection mechanism 124. This protection ensures that any entity associated with the second file system 120 (or any other entity or entities) cannot inappropriately access and interact with any information maintained by the first file system 116. For example, any entity associated with the second file system 120 cannot access the client key ($Key_C$) maintained by the first OS 114.

Figure 4:
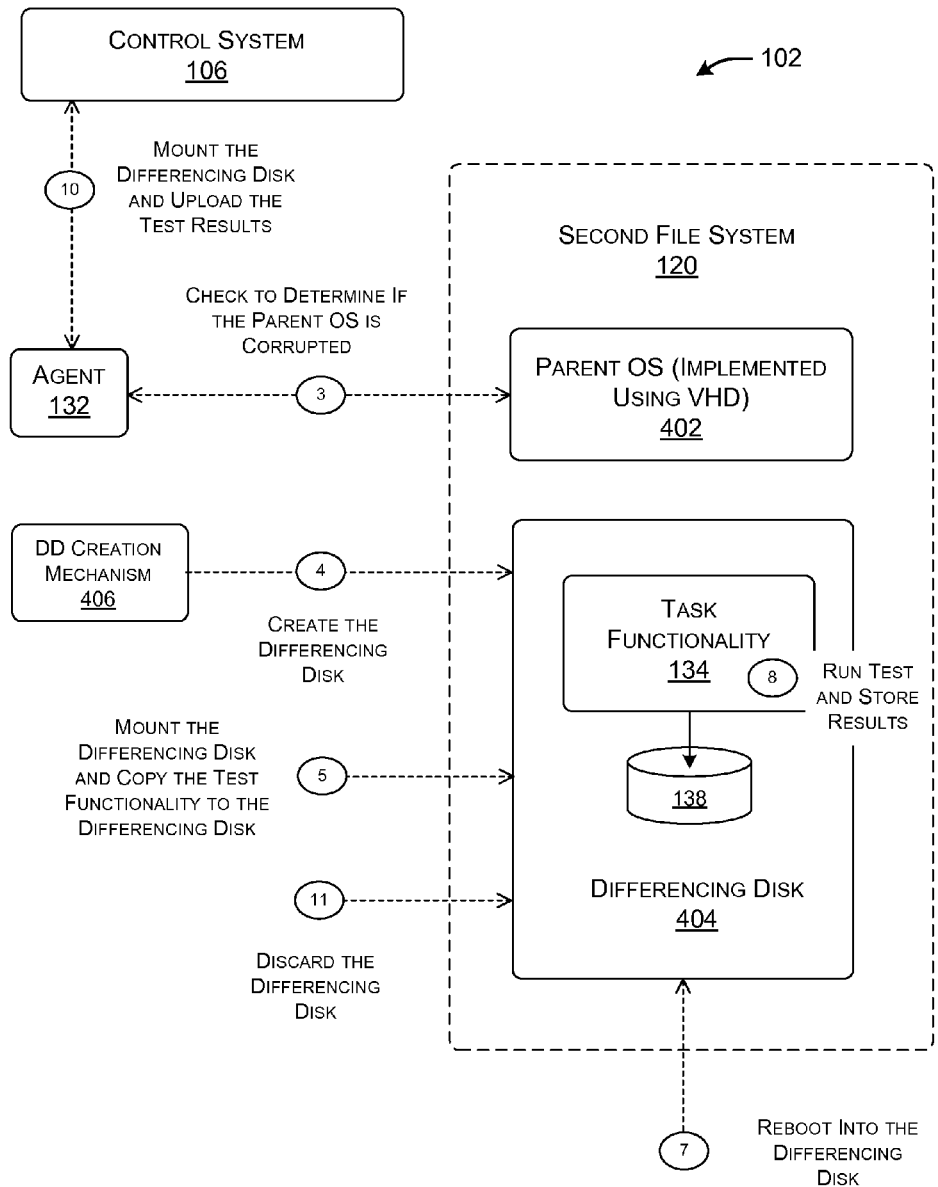
FIG. 4 shows one way of implementing the second file system of FIG. 1.
Figure 5:
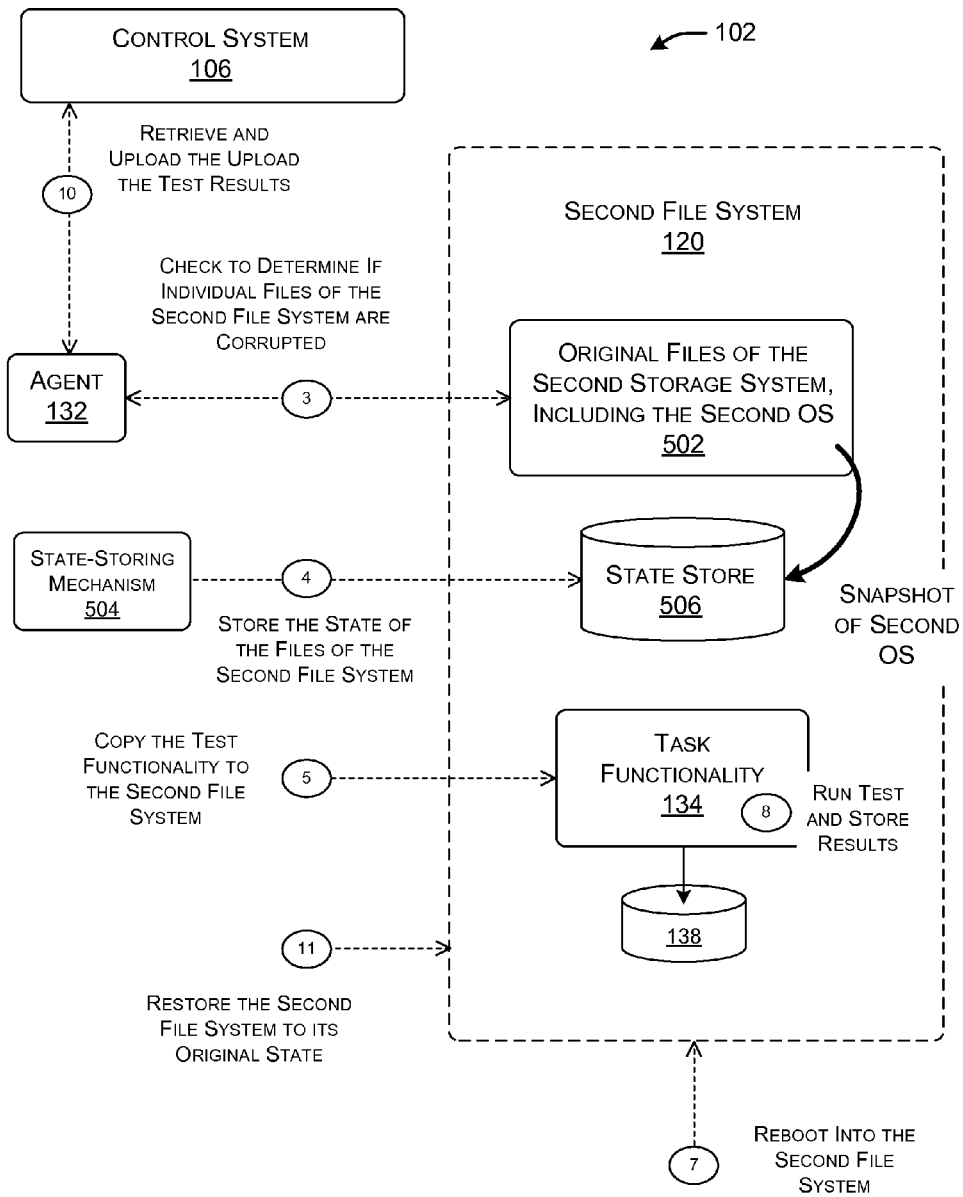
FIG. 5 shows another way of implementing the second file system of FIG. 1.

As a second measure, the second file system 120 uses reversion functionality which enables it to store the state of the second file system 120 after a successful hash check has been performed (by the agent 132), but prior to the task being performed. This state is referred to as a clean state herein. The reversion functionality then restores the state of the second file system 120 to the clean state after the test has been performed. This operation effectively removes any deleterious effects to the second file system 120 that may have been caused by running the untrusted code. FIGS. 4 and 5 provide two ways of implementing the above-described reversion functionality. As a general characteristic, the reversion functionality is considered efficient insofar as it avoids the time-consuming need to reinstall an operating system from scratch.

After the task has been performed, the boot manager 112 boots back into the first OS 114. The agent 132 then retrieves the results from the data store 138 and forwards the results to the control system 106 over the encrypted channel 110.

Overall, the processing platform 104 successfully isolates the first OS 114 and the control system 106 from the task that is performed using the resources of the second file system 120. Furthermore, the processing platform 104 achieves this isolation by directly performing the processing on the physical system which implements the processing platform 104, without the use of a virtual machine abstraction. By virtue of this characteristic, the processing platform 104 provides suitable functionality for performing tasks on physical systems which do not readily accommodate the use of virtual machines, such as systems which use RISC-based technology. This is merely one example, however; in other cases, a test engineer may decide to run tasks directly on a physical system for other environment-specific reasons.

Finally, the first file system 116 may periodically contact a monitoring service (M.S.) 140, or the monitoring service 140 may periodically contact the first file system 116. This interaction ensures that the untrusted code which runs on the second file system 120 does not subvert the above sequence of operations, thereby preventing the boot manager 112 from booting back into the first OS 114 upon the termination of the task performed using the resources of the second file system 120. That is, the monitoring service 140 can detect that such a hijack event has occurred when the first file system 116 fails to check in by a prescribed time. The monitoring service 140 may then take steps to restore the appropriate flow of control within the processing platform 104.

For example, the control system 106 may implement the monitoring service 140. In that case, the monitoring service 140 may detect whether the agent 132 fails to contact it within a prescribed amount of time after initiating a task. If this event occurs, the monitoring service 140 can notify a human operator associated with the processing platform 104 and/or take other corrective action(s).

Figure 2:
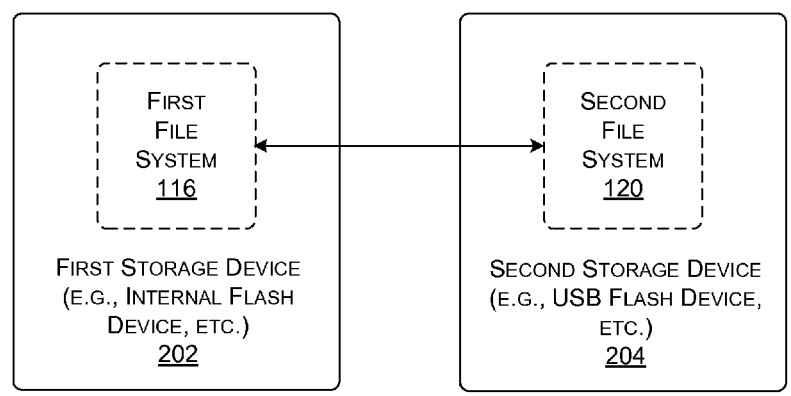
FIG. 2 shows storage devices for implementing the first and second file systems.

FIG. 2 shows storage devices for implementing the first file system 116 and the second file system 120. More specifically, the first file system 116 corresponds to instructions and data stored on a first storage device 202. The second file system 120 corresponds to instructions and data stored on a second storage device 204.

In one case, the first storage device 202 represents a different physical storage device than the second storage device 204. For example, the first storage device 202 may represent an internal flash device or a physical hard disk device provided by the processing platform 104. The second storage device 204 may represent a removable flash device, such as a USB flash device.

Implementing the second file system 120 using a portable memory device may confer various advantages. For example, a test administrator may leverage the use of a portable memory device to quickly provision a group of processing platforms, e.g., by copying the second OS 118 onto a collection of portable storage devices, and then deploying the storage devices in respective processing platforms. Further, it is possible to reduce the depletion of write-erase cycle counts associated with an internal flash device by not implementing the second OS 118 on an internal flash device.

In other cases, at least parts of the first file system 116 and the second file system 120 may be implemented by the same physical storage device. For example, the first file system 116 and the second file system 120 may represent different portions (e.g., sectors, etc.) of the same internal flash device or a physical hard disk device.

FIG. 3 is a flow diagram which shows one manner of operation of the processing framework 102 of FIG. 1, e.g., using a series of numbered dashed-line arrows to represent an illustrative sequence of operations. To facilitate illustration and explanation, certain details shown in FIG. 1 are omitted in the depiction of FIG. 3.

In operation (1), the boot manager 112 boots into (that is, loads) the first OS 114, which is considered the safe OS because it is protected using the file protection mechanism 124. In operation (2), the agent 132 establishes a connection with the control system 106 over the secure channel 110. The agent 132 may also receive work instructions from the control system 106 via this connection. The work instructions may include one or more applications to be tested using the second file system 120.

In operation (3), the agent 132 determines whether the second OS 118 has been corrupted. As described above, the agent 132 can perform this task by forming at least one hash of the second OS 118, and then comparing that hash with a reference hash. The reference hash represents the state of the second OS 118 when it is known to be clean. If the two hashes match, then the agent 132 can conclude that the second OS 118 is currently in a clean state. If the hashes do not match, then the agent 132 can conclude that the second OS 118 has been corrupted. Assume that the two hashes match.

In operation (4), the second file system 120, under the direction of the agent 132, can store the state of the second OS 118. The second file system 120 can perform this operation in different ways, two or which are described below in the context of the explanation of FIGS. 4 and 5. In operation (5), the agent 132 can then provide the task functionality 134 to the second file system 120 (and/or to some other entity or entities of the processing platform 104). As noted above, the task functionality 134 may represent whatever code, settings, and/or data that the processing platform 104 uses to perform the allotted task. For example, the task functionality 134 may provide a copy of the application 136 to be tested, as well as one or more parameters which define how the test is to be conducted.

In operation (6), the agent 132 can store an entry in the boot data store 122. That entry identifies the second file system 120. In operation (7), the agent 132 instructs the boot manager 112 to reboot the processing platform 104. The boot manager 112 responds by loading the second file system 120, as per the one-time entry that has been stored in the boot data store 122, which redirects the boot manager to the second file system 120.

In operation (8), the second file system 120 is configured to automatically invoke the task functionality 134 after it is loaded. The task functionality 134 stores the results of its processing in the data store 138. At the conclusion of this operation, the second file system 120 may instruct the boot manager 112 to again reboot the processing platform 104. At this juncture, in operation (9), the boot manager 112 can return to its default booting behavior by booting back into the first OS 114. In operation (10), the agent 132 can retrieve the results stored in the data store 138 and send the results over the encrypted channel 110 to the control system 106. The monitoring service 140 (which may be implemented by the control system 106) can detect whether the boot manager 112 has failed to boot back into the first OS 114, and if so, take corrective measures. The boot manager 112 may fail to boot back into the first OS 114 because the task that is run using the unsafe second OS 118 may have corrupted the second OS 118, or otherwise corrupted the desired task sequence.

In operation (11), the second file system 120, under the direction of the agent 132, can restore the second file system 120 to its clean state. FIGS. 4 and 5, to be explained below, set forth two ways that this reversion can be performed. As a result of this operation, the second file system 120 can remove all changes that have been made to the second file system 120 following the execution of the integrity-checking operation, in operation (3). Those changes may be due to the storage of the task functionality 134 and its results in the second file system 120, and any modifications (malicious or not) that the task has produced within the second OS 118.

At this juncture, the processing platform 104 may repeat the above operations, starting with operation (2). That is, in operation (2), the agent 132 may interact with the control system 106 to receive additional work instructions, following by, in operation (3), repeating the integrity-checking operation, and so on. The processing framework 102 can repeat this process until all the work specified by the control system 106 has been completed, or until some other termination condition has been reached.

FIG. 4 shows one way of implementing the second file system 120 of FIG. 1. FIG. 4 also shows flow paths which describe one manner of operation of the embodiment shown in FIG. 4. More specifically, the annotated flow paths shown in FIG. 4 correlate with the same-numbered flow paths introduced in FIG. 3. Note that certain structural features and operations, which have already been described, are omitted in FIG. 4 to simplify the explanation.

In the embodiment of FIG. 4, the second file system 120 includes a parent operating system (OS) 402 that is implemented as a virtual hard disk (VHD), which runs on a physical host storage device (or devices) of any type(s). The second file system 120 also includes a differencing disk 404 that is produced by a differencing disk (DD) creation mechanism 406.

Subsequent to the creation of the differencing disk 404, the second file system 120 stores any changes made to the second file system 120 to the differencing disk 404, leaving the parent OS 402 unchanged. For example, in one implementation, the differencing disk 404 stores the task functionality 134, together with the results produced by the task functionality 134. In another implementation, one or more other entities, that are accessible to the first OS 114 and the second OS 402, can store the task functionality 134 and the data store 138.

In one case, the differencing disk 404 may itself be implemented as a virtual hard disk (VHD). The DD creation mechanism 406 may be implemented as a part of the second file system 120, or a component that is external to the second file system 120, but accessible to the second file system 120.

With respect to the flow paths which annotate FIG. 4 (shown in dashed-line arrows), in operation (3), the agent 132 checks to determine whether the parent OS 402 has been corrupted. Again, the agent 132 can perform this operation by comparing a current hash of the parent OS 402 in its current state with a reference hash, representing the parent OS 402 in a clean state.

In operation (4), the agent 132 initiates the creation of the differencing disk 404 using the DD creation mechanism 406. In operation (5), the agent 132 mounts the differencing disk 404 and copies the task functionality 134 to the differencing disk 404 (in one non-limiting implementation). In operation (7), the boot manager 112 boots into the differencing disk 404. In operation 8, the task functionality 134 runs its task using the resources of the parent OS 402, together with any changes to the parent OS 402 that have been stored on the differencing disk 404. More specifically, the task functionality 134 can perform its operations, at each instance, by first looking for operating system functionality that originates from the differencing disk 404; if the requested functionality is not found on the differencing disk 404, it will access the functionality from the parent OS 402.

In operation (10), after booting back into the first OS 114, the agent 132 mounts the differencing disk 404, retrieves the results from the data store 138, and sends the results to the control system 106. Again, the monitoring service 140 can address the situation in which the boot manager 112 fails to boot back into the first OS 114 within a prescribed amount of time after the initiation of the task sequence. In operation (11), the agent 132 effectively restores the second file system 120 to its pre-task state by discarding the information stored on the differencing disk 404. In other words, the second file system 120 can be said to store the clean state of the second file system 120 by maintaining the parent OS 402 in an unaltered form—that is, by not making any changes directly to the parent OS 402. The agent 132 can restore the clean state by simply discarding (e.g., deleting, overwriting, or ignoring, etc.) the information that has been stored on the differencing disk 404.

FIG. 5 shows another way of implementing the second file system 120 of FIG. 1. FIG. 5 also shows flow paths which describe one manner of operation of the embodiment shown in FIG. 5. More specifically, the annotated flow paths shown in FIG. 5 correlate with the same-numbered flow paths introduced in FIG. 3. Again note that certain structural features and operations, which have already been described, are omitted in FIG. 5 to simplify the explanation.

In the embodiment of FIG. 5, the second file system 120 includes a set of original files 502 that implement the second OS 118. The second file system 120 may store these files 502 in any storage domain, e.g., in a particular volume or volumes of an underlying storage device. The second file system 120 may also interact with a state-storing mechanism 504, which may represent a part of the second file system 120 or a component which is external to the second file system 120. The state-storing mechanism 504 operates by storing a snapshot which represents the state of the second file system 120 at a designated time. In one embodiment, the state-storing mechanism 504 may be implemented using the Volume Shadow Copy Service (VSS) provided by Microsoft® Corporation of Redmond, Wash. The state-storing mechanism 504 can store its snapshot in a data store 506, which may be part of the second file system 120 or separate therefrom. Thereafter, any changes that are made to the second OS 118 are directly made to the files 502 (rather than a differencing disk, as in the implementation of FIG. 4).

In one implementation, the task functionality 134 may be stored in the same storage domain (e.g., on the same volume) as the files 502 which implement the second OS 118. The task functionality 134 may also store its results to that same storage domain. In another implementation, the task functionality 134 and/or the data store 138 may be provided by one or more other entities of the processing platform 104 that are accessible to both the first OS 114 and the second OS 118.

With respect to the flow paths which annotate FIG. 5 (shown as dashed-line arrows), in operation (3), the agent 132 checks to determine whether the files 502 associated with the second OS 118 have been corrupted. The agent 132 can perform this task by comparing a current hash of each individual file with a reference hash. By contrast, in FIG. 4, the agent 132 can perform this operation by comparing a single hash associated with the entire second OS 118 with a single reference hash. This same operation may not be appropriate in the case of FIG. 5 because the files associated with the second OS 118 may not necessarily be associated with a single unified volume.

In operation (4), the agent 132 may command the state-storing mechanism 504 to produce a snapshot that represents the state of the files 502, in their verified clean state. The state-storing mechanism 504 stores the snapshot in the data store 506. In operation (5), the agent 132 can provide the task functionality 134 to the same storage domain as the files 502 (and/or to some other entity or entities). In operation (7), the boot manager 112 boots into the second filing system 120. In operation (8), the task functionality 134 runs the task on the second file system 120 (and/or on some other entity or entities), using the resources of the files 502.

In operation (10), after booting back into the first OS 114, the agent 132 retrieves the results from the data store 138, and sends the results to the control system 106. In operation (11), the agent 132 restores the second file system 120 to its clean state based on the snapshot that is stored in the data store 506.

In summary, in the embodiment of FIG. 4, the reversion functionality corresponds to: (a) functionality for invoking the DD creation mechanism 406, for creating the differencing disk 404 and leaving the parent OS 402 intact to represent the clean state; and (b) functionality for subsequently discarding information stored on the differencing disk 404 after the task is performed. In the embodiment of FIG. 5, the reversion functionality corresponds to: (a) functionality for invoking the state-storing mechanism 504, for creating a snapshot of the state of the second OS 118 in the clean state; and (b) functionality for subsequently reverting to the clean state after the task has been performed based on the stored snapshot. In one implementation, the reversion functionality may correspond to control code provided by the agent 132 which controls the operation of the DD creation mechanism 406 (in the implementation of FIG. 4) and the state-storing mechanism 504 (in the implementation of FIG. 5).

While this explanation has presented two ways of implementing the reversion functionality, the processing platform 104 can use yet other technology and processes to implement this feature. In general, any technology can be used that enables the processing platform 104 to: (a) store a state of the second OS 118 after it has been verified as clean; and (b) quickly return to that state after the task has been performed based on the stored state.

Figure 6:
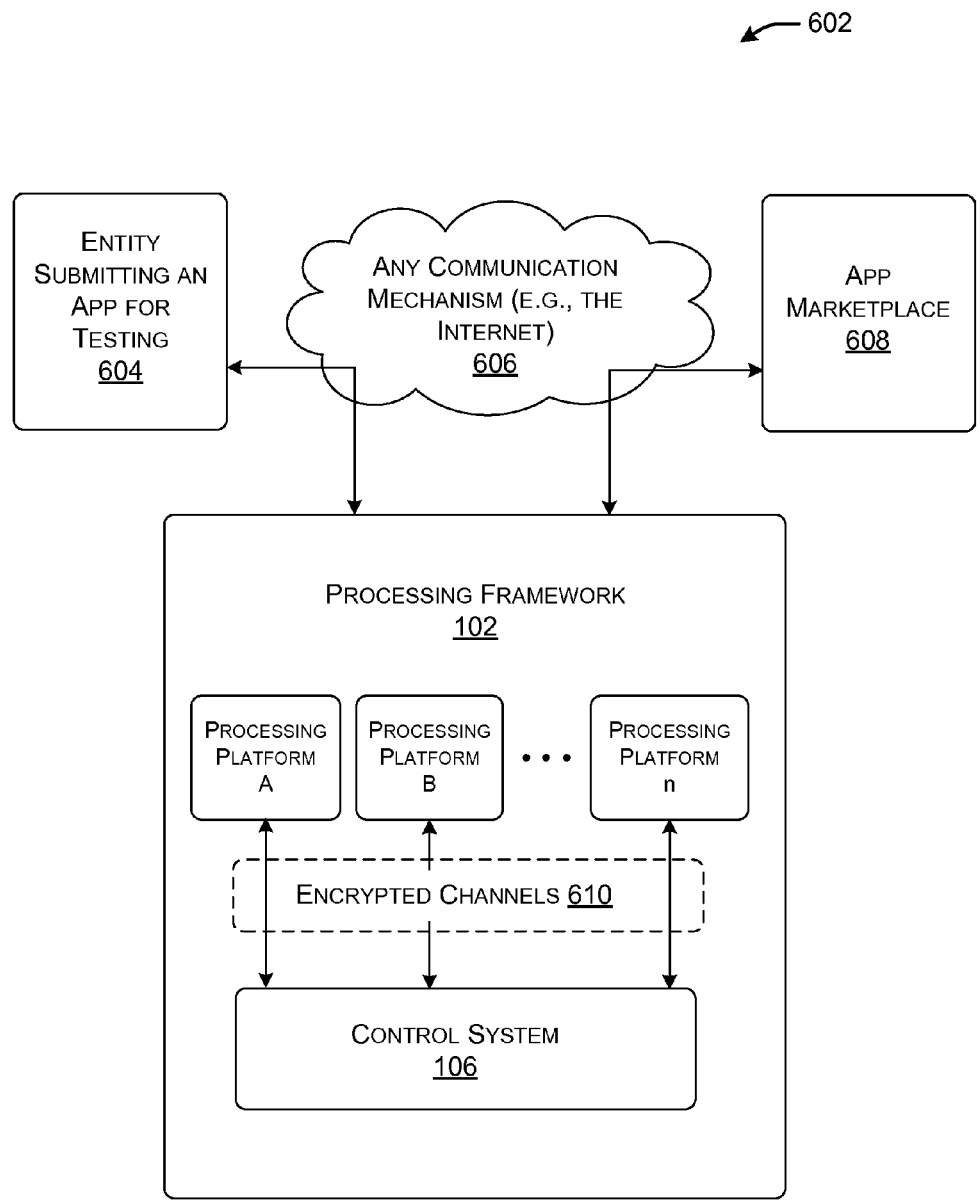
FIG. 6 shows one environment in which the processing framework of FIG. 1 can be used.

FIG. 6 shows one environment 602 in which the processing framework 102 of FIG. 1 can be used. In this context, the processing framework 102 receives an application from at least one entity 604. For example, the entity 604 may represent an application developer who develops the application and submits it to the processing framework 102 using any computer device, via any communication mechanism 606 (such as the Internet). The processing framework 102 then tests the application to determine if it satisfies a set of desired characteristics. For example the processing framework 102 can test the application to determine if it is free from security threats and other undesirable behavior. If the application passes these tests, the processing framework 102 can post it to an application marketplace 608. End users may visit the application marketplace 608 to obtain a copy of the application based on any business paradigm.

The processing framework 102 itself can include any number of processing platforms (e.g., processing platform A, B, . . . , n). Each processing platform may have the characteristics depicted in FIG. 1. The processing platforms may also interact with the control system 106 over any communication mechanism, such as the communication mechanism 606 (e.g., the Internet), via respective encrypted channels 610. Although not shown, the processing framework 102 can provide additional security mechanisms, such as by using a perimeter network or the like between the processing platforms and the control system 106.

The processing framework 102 shown in FIG. 1 can be deployed in other contexts to perform any other tasks. These tasks involve running untrusted code directly on underlying physical systems of the processing platforms, without the use of virtual machines. These tasks, however, need not be characterized as "testing" in all cases. For example, a processing platform can rely on the architecture shown in FIG. 1 to perform a task on untrusted code to achieve a desired objective after being deployed "in the field," under the direction of an end user.

B. Illustrative Processes

Figure 7:
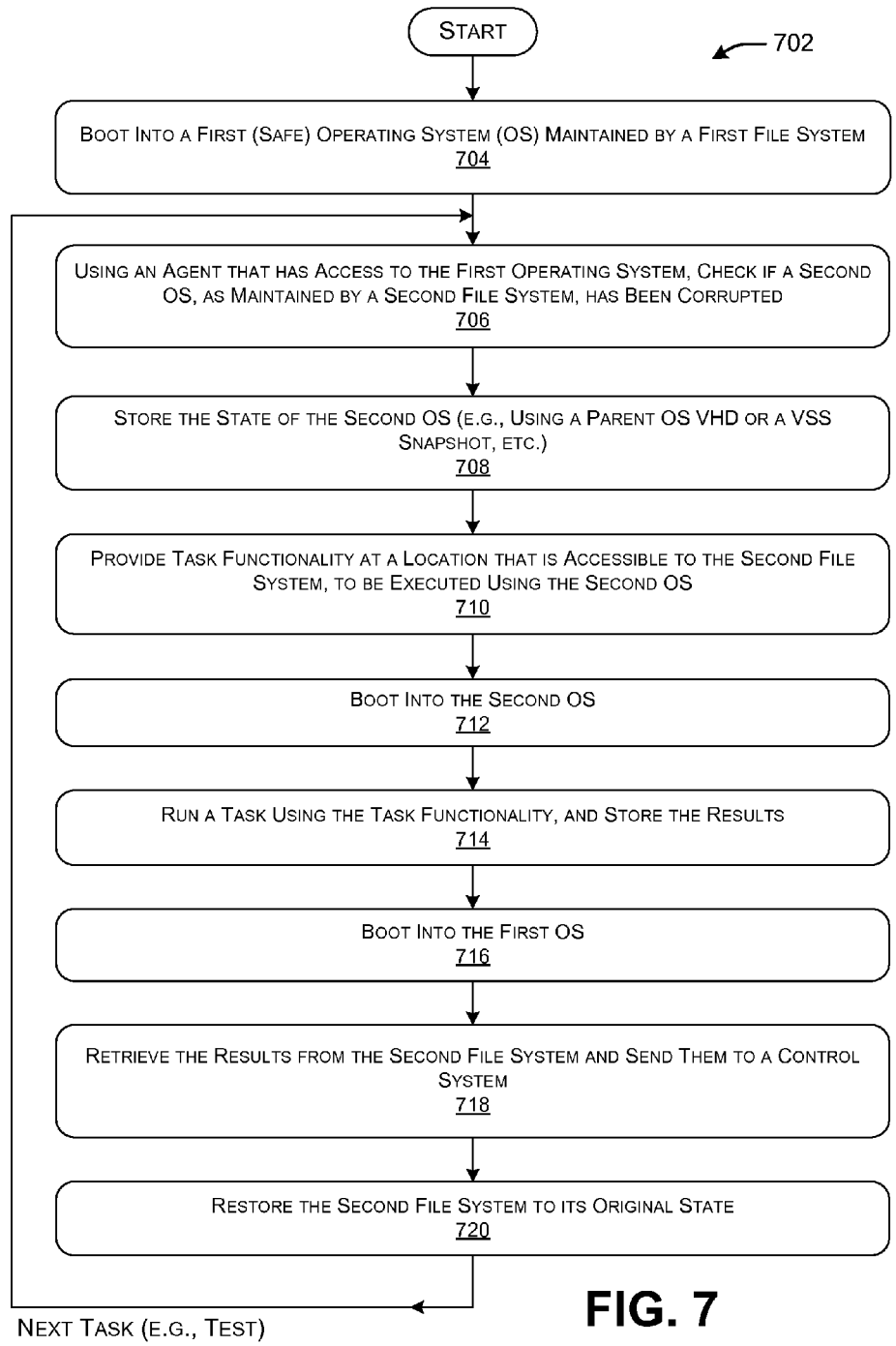
FIG. 7 is a flowchart that shows one manner of operation of the processing framework of FIG. 1.

FIG. 7 shows a procedure 702 that explains one manner of operation of the processing framework 102 of FIG. 1. Since the principles underlying the operation of the processing framework 102 have already been described in Section A, certain operations will be addressed in summary fashion in this section.

In operation 704, the boot manager 112 can boot into the first OS 114. Although not shown in FIG. 7, the agent 132, that is accessible to the first OS 114, may then establish a secure connection with the control system 106 to obtain work instructions from the control system 106. In operation 706, the agent 132 checks the second OS 118 to determine if it has been corrupted. In operation 708, the processing platform 104 stores the clean state of the second OS 118. FIGS. 4 and 5 depict two ways that this operation can be performed. In operation 710, the agent 132 provides the task functionality 134 to the second file system 120 and/or to one or more other entities of the processing platform 104 that are accessible to the first OS 114 and the second OS 118. In operation 712, the boot manager 112 boots into the second OS 118 provided by the second file system 120. In operation 714, the second file system 120 runs a task using the task functionality 134 and stores the results in the data store 138.

In operation 716, the boot manager 112 boots back into the first OS 114. The monitoring service 140 will detect if this operation fails to take place within a prescribed amount of time. In operation 718, the agent 132 retrieves the results provided in the data store 138, and sends those results over the encrypted channel 110 to the control system 106. In operation 720, the processing platform 104 can restore the second file system 120 to an original clean state based on the state that has been stored. FIGS. 4 and 5 describe two respective ways that this operation can be performed.

Finally, the procedure 702 indicates that the processing flow may return to operation 706, where the agent 132 may retrieve new work instructions from the control system 106, after which it again performs an integrity check on the second OS 118, and so on.

C. Representative Computing Functionality

FIG. 8 shows illustrative computing functionality 802 that can be used to implement any aspect of the functions described above. For example, the type of computing functionality 802 shown in FIG. 8 can be used to implement any aspect of the processing platform 104 shown in FIG. 1. The type of computing functionality 802 shown in FIG. 8 can also be used to implement any aspect of the control system 106 of FIG. 1. In all cases, the computing functionality 802 represents one or more physical and tangible processing mechanisms.

The computing functionality 802 can include one or more processing devices 804, such as one or more central processing units (CPUs), and/or one or more graphical processing units (GPUs), and so on. The processing devices 804 may optionally incorporate RISC-based technology or other technology that does not readily accommodate the use of a virtual machine.

The computing functionality 802 can also include any storage resources 806 for storing any kind of information, such as code, settings, data, etc. Without limitation, for instance, the storage resources 806 may include any of: RAM of any type(s), ROM of any type(s), flash devices, hard disk drive devices, optical disk drive devices, and so on. More generally, any storage resource can use any technology for storing information. Further, any storage resource may provide volatile or non-volatile retention of information. Further, any storage resource may represent a fixed or removal component of the computing functionality 802.

As to terminology, any of the storage resources 806, or any combination of the storage resources 806, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 802 also includes an input/output module 808 for receiving various inputs (via input devices 810), and for providing various outputs (via output devices). Illustrative input devices include a keyboard device, a mouse input device, a touchscreen input device, a digitizing pad, one or more cameras, a voice recognition mechanism, any movement detection mechanisms (e.g., an accelerometer, gyroscope, etc.), and so on. One particular output mechanism may include a presentation device 812 and an associated graphical user interface (GUI) 814. The computing functionality 802 can also include one or more network interfaces 816 for exchanging data with other devices via one or more communication conduits 818. One or more communication buses 820 communicatively couple the above-described components together.

The communication conduit(s) 818 can be implemented in any manner, e.g., by a local area network, a wide area network (e.g., the Internet), point-to-point connections, etc., or any combination thereof. The communication conduit(s) 818 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the description may have described various concepts in the context of illustrative challenges or problems. This manner of explanation does not constitute a representation that others have appreciated and/or articulated the challenges or problems in the manner specified herein. Further, the claimed subject matter is not limited to implementations that solve any or all of the noted challenges/problems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of evaluating effects of an execution of an application upon and within an operating environment, the method involving a device having a processor and comprising:
   executing, by the processor, instructions that cause the device to:
      store a first instance of the operating environment;
      create a second instance of the operating environment as a differential container that stores changes to the operating environment of the second instance relative to the first instance of the operating environment;
      initiate execution of the application within the second instance of the operating environment, wherein changes to the operating environment resulting from executing the application are stored in the differential container and not applied to the first instance of the operating environment; and
      within the first instance of the operating environment, evaluate the differential container to determine the effects of executing the application upon and within the second instance of the operating environment.

2. The method of claim 1, wherein:
   creating the second instance of the operating environment further comprises: creating the differential container for the second instance of the operating environment solely for evaluating the effects of executing the application upon and within the second instance of the computing environment; and
   executing the instructions further causes the device to, after evaluating the differential container to determine the effects of executing the application upon and within the second instance of the computing environment, discard the differential container and the second instance of the operating environment.

3. The method of claim 1, wherein:
   executing the application within the second instance of the operating environment further comprises: booting the device into the second instance of the operating environment; and
   evaluating the differential container within the first instance of the operating environment further comprises: after completion of executing the application within the second instance of the operating environment, rebooting the device into the first instance of the operating environment.

4. The method of claim 1, wherein:
   executing the application within the second instance of the operating environment further comprises: booting the device into the second instance of the operating environment; and
   evaluating the differential container within the first instance of the operating environment further comprises: responsive to executing the application within the second instance of the operating environment for a limited execution duration, rebooting the device into the first instance of the operating environment.

5. The method of claim 4, wherein:
   evaluating the differential container within the first instance of the operating environment further comprises: after completion of executing the application within the second instance of the operating environment:
      rebooting the device into the first instance of the operating environment, and
      within the first instance of the operating environment, checking in with a monitoring service; and
   executing the application within the second instance of the operating environment for the limited execution duration further comprises: receiving, from the monitoring service, an instruction to reboot into the first instance of the operating environment, after the first instance has failed to check in with the monitoring service after completion of executing the application.

6. The method of claim 4, wherein:
   the device further comprises a boot manager that boots the device into a selected instance of the operating environment, and that by default boots into the first instance of the computing environment; and
   booting the device into the second instance further comprises: providing to the boot manager a one-time instruction to boot into the second instance.

7. The method of claim 1, wherein executing the instructions further causes the device to install the application within the second instance of the operating environment, wherein the application installed within the second instance is only installed within the differential container of the second instance of the operating environment and not applied to the first instance of the operating environment.

8. The method of claim 1, wherein executing the instructions further causes the device to install, within the differential container for the second instance of the operating environment, an application manager that:
   responsive to the device booting into the second instance of the operating environment, initiates execution of the application; and
   responsive to completing execution of the application, initiates rebooting of the device into the first instance of the operating environment.

9. The method of claim 1, wherein:
   the operating environment provides a set of operating environment resources; and
   evaluating the determining the effects of executing the application upon and within the operating environment further comprises: identifying, within the differential container, changes to operating environment resources that represent a corruption of the operating environment by the application.

10. The method of claim 1, wherein executing the instructions further causes the device to:

capture a pre-execution state of the differential container before executing the application; and after evaluating the differential container to determine the effects of executing the application upon and within the second instance of the computing environment, restore the differential container to the pre-execution state.

11. The method of claim 10, wherein:

capturing the pre-execution state of the differential container further comprises: record representations of respective data objects of the differential container in the pre-execution state; and restoring the differential container to the pre-execution state further comprises:

comparing the respective data objects of the differential container with the representations in the pre-execution state; and refresh the respective data objects that have changed between the differential container and the pre-execution state, using the representations in the pre-execution state.

12. The method of claim 11, wherein:

recording the representations of the respective data objects further comprises: computing pre-execution hashcodes of the respective data objects; and comparing the respective data objects of the differential container with the representations in the pre-execution state further comprises:

computing post-execution hashcodes of the respective data objects; and comparing the pre-execution hashcodes and the post-execution hashcodes of the respective data objects.

13. The method of claim 1, wherein executing the instructions further causes the device to, after executing the application, verify an integrity of the first instance of the operating environment.

14. The method of claim 1, wherein:

the device further comprises a boot manager that manages booting into respective instances of the operating environment; and executing the instructions further causes the device to, after executing the application, verify an integrity of the boot manager.

15. A computing device that evaluates an application, comprising:

a processor; and a memory storing:

an agent executing within a first instance of the operating environment that:

configures a second instance of the operating environment to execute the application upon booting, and evaluates the second instance of the operating environment to determine the effects of executing the application upon and within the second instance of the operating environment;

a boot manager that:

boots the computing device into the second instance of the operating environment; and after completion of execution of the application within the second instance of the operating environment, reboots the computing device into the first instance of the operating environment;

an operating environment protector that prevents the second instance of the operating environment from accessing the first instance of the operating environment; and a second instance restorer that, after the agent evaluates the second instance of the operating environment, restores the second instance to match the first instance of the operating environment.

16. The computing device of claim 15, wherein:

the first instance of the computing environment comprises a set of files stored by a file system; and the operating environment protector prevents the second instance of the operating environment from accessing the first instance of the computing environment by instructing the file protection mechanism to prevent the second instance of the operating environment from accessing files of the first instance of the operating environment.

17. The computing device of claim 16, wherein:

the file system further encrypts the files of the first instance of the operating environment using a cryptographic key; and the operating environment protector prevents the second instance of the operating environment from accessing the files of the first instance of the operating environment by refusing to release the cryptographic key for the files of the first instance to the second instance of the operating environment.

18. The computing device of claim 17, wherein the operating environment protector further comprises a trusted platform module (TPM) circuit that regulates access by respective instances of the operating environment to the file system.

19. A system that evaluates safety of untrusted applications that execute within an operating environment, the system comprising:

at least one processing device programmed via code to:

store a first instance of the operating environment; and responsive to a submission of an untrusted application:

create a second instance of the operating environment, wherein the second instance of the operating environment further comprises a differential container that stores changes to the operating environment of the second instance relative to the first instance of the operating environment;

initiate execution of the untrusted application within the second instance of the operating environment, wherein changes to the operating environment resulting from executing the untrusted application are stored in the differential container and not applied to the first instance of the operating environment;

within the first instance of the operating environment, evaluate the differential container to determine the effects of executing the untrusted application upon and within the second instance of the operating environment;

determine, according to the effects of executing the untrusted application upon and within the second instance of the operating environment, whether the untrusted application compromises integrity of the operating environment; and determine the safety of the application according to whether the untrusted application compromises the integrity of the operating environment.

20. The system of claim 19, wherein:

the system further comprises an application submission of an application store; and the at least one processing device is further programmed via code to, responsive to determining the safety of the untrusted application as a safe application, adding the safe application to the application store for distribution to users.

\* \* \* \* \*